Nov. 6, 1923.
E. N. BERGGREN
1,472,786
SHUTTER ACTUATING MECHANISM
Filed March 26, 1921
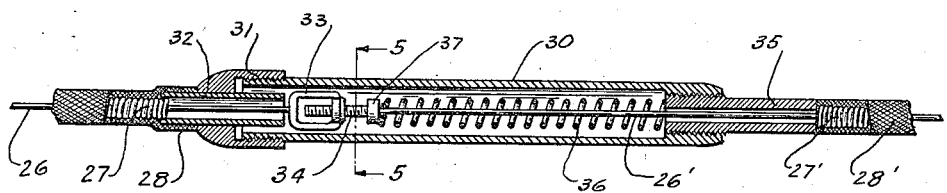
Fig. 4
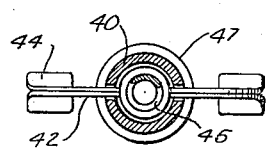
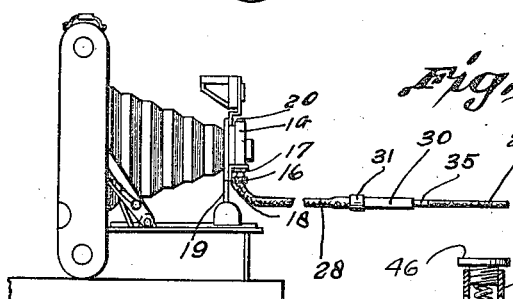
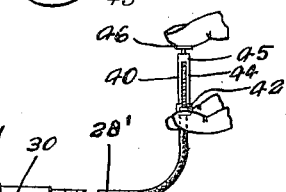
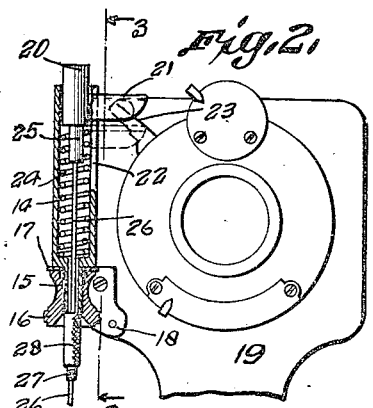
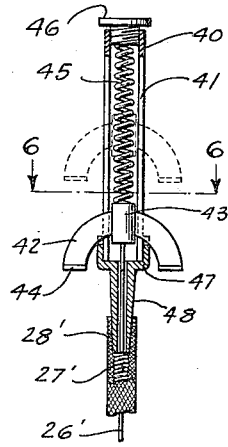
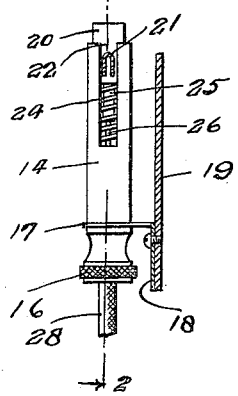
Witnesses:
Wm. Schnellhardt.
J. D. Stuwe.
Inventor
Eric N. Berggren
By Joshua R. H. Roth
His Attorney Patented Nov. 6, 1923.

1,472,786

UNITED STATES PATENT OFFICE.

ERIC NELS BERGGREN, OF CHICAGO, ILLINOIS.

SHUTTER-ACTUATING MECHANISM.

Application filed March 26, 1921. Serial No. 455,763.

*To all whom it may concern:*

Be it known that I, ERIC NELS BERGGREN, a citizen of the United States, and a resident of the city of Chicago, county of Cook, and State of Illinois, have invented certain new and useful Improvements in Shutter-Actuating Mechanism, of which the following is a specification.

My invention relates to improvements in shutter actuating mechanism and has for its object the provision of means with which the camera shutter may be operated from a distant point and with which a person can take his own picture.

Other objects will appear hereinafter.

The invention consists in the combinations and arrangements of parts hereinafter described and claimed.

The invention will be best understood by reference to the accompanying drawings forming a part of this specification, and in which, Fig. 1 is a side view showing my invention applied to a camera.

Fig. 2 is a front view of a portion of a camera, and my invention attached thereto, the shutter operating tube being shown in section taken on line 2—2 of Fig. 3.

Fig. 3 is a view taken on line 3—3 of Fig. 2.

Fig. 4 is a sectional view through the coupling joint.

Fig. 5 is a sectional view taken on line 5—5 of Fig. 4.

Fig. 6 is a sectional view taken on line 6—6 of Fig. 7; and

Fig. 7 is a sectional view of the hand operated member.

The form of invention illustrated comprises hand operated means attached to one end of a power transmitting member or tubular conduit, the other end of which is fastened to a shutter operating mechanism which is mounted on the camera in place of the customary shutter operating means.

The shutter operating mechanism comprises a main member or tube 14 provided with a threaded extension 15 at its lower end upon which a thumb nut 16 is seated. The lower end of said tube 14 and the nut 15 serve to clamp the operating mechanism upon the horizontal arm 17 of the usual bracket 18 attached to the face of the camera 19. A plunger 20 is slidably mounted in the upper end of said tube 14 and is provided with a lateral channeled arm 21 which extends through a slot 22 in said tube and engages over the usual shutter operating lever 23 of the camera. A spring 24 is positioned in the tube 14 around a stem 25 on said plunger 20 and bears beneath said plunger to normally retain it elevated. A wire 26 is fastened to stem 25 and passes through an opening in the threaded extension 15 and into a coiled wire tube 27 attached to the lower end of said extension. A tubular covering 28, preferably of woven fabric, surrounds said coiled tube, the tube 27 and covering 28 forming a conduit.

The power transmitting member which connects the shutter operating mechanism with the hand operated means consists of several segments joined by coupling members so that segments may be removed or added and the length of said power transmitting member varied. The coupling member comprises a tube 30 exteriorly threaded at one end to retain a threaded cap 31 provided with an outwardly extending pipe 32. The tubular covering 28 is fastened around the outside of said pipe 32 and the coiled tube 27 on its inside. Wire 26 in said coiled tube 27 passes through pipe 32 and is fastened to a yoke 33 of a turnbuckle, the companion member or threaded rod 34 of which is fastened to the wire 26' of the adjoining segment of the power transmitting member, said wire passing through a hollow stem 35 threaded into the free end of tube 30. A spring 36 is positioned in said tube 30 and bears against a collar 37 on the rod 34 to normally retain said rod and wire in the cap end of tube 30. A coiled tube 27' and covering 28' are fastened on the free end of stem 35.

The hand operated means comprises a casing 40 provided with longitudinal slots 41 through which extend arms 42 of a plunger 43 slidably mounted in said casing, said arms carrying finger plates 44 at their outer ends. A spring 45 bears against a cap 46 threaded in the top of casing 40 and on said plunger 43 to retain it at the lower part of said casing. A cap 47 provided with an extension 48 is fastened on the lower end of said casing, the coiled tube 27' and covering 28' being attached to said extension and the wire 26' being fastened to said plunger 43.

In operation, the device is clamped on the customary bracket on the camera in place of the usual shutter operating mechanism, and after the camera is properly positioned the party desiring to take the picture with himself included holds the operating means in his hand, preferably out of view of the camera finder, and presses the finger plates 44 and thumb plate 46 together as shown in dotted lines in Fig. 7, thereby drawing on the wire 26 and pulling down the plunger 20 and arm 21 actuating the shutter lever 23. If it is desired to change the length of the segmental power transmitting member, the tube 30 is unscrewed from cap 31 and the turnbuckle members 33 and 34 are disconnected whereupon an additional segment may be inserted or a segment may be removed by releasing the second end of one of the segments operated as outlined above. This device is also well adapted to take pictures of wild animals and birds since the camera may be set up in the clearing and may be operated by a person hidden a considerable distance from the camera.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. A shutter actuating device for a camera having a shutter lever and a supporting bracket, said device comprising a tubular member adapted to be removably clamped on said bracket; a plunger slidably mounted in said tubular member, a lever actuating member extending laterally from said plunger for engaging and actuating said shutter lever, resilient means embracing said plunger for normally retaining said actuating member in released position, and power transmitting means connecting said actuating member and said tubular member with a distant operating member.

2. A shutter actuating device for a camera having a shutter lever and a bracket, said device comprising a tubular member adapted to be mounted on said bracket; a plunger mounted in said tubular member, an arm on said plunger extending laterally through said tubular member to loosely bear on and actuate said shutter lever, a flexible covering connected to said tubular member, a wire connected to said plunger and passing through said flexible covering, and an operating mechanism connected to said wire for tensioning the wire whereby a picture may be taken from a distant point.

3. A shutter actuating device for a camera having a shutter lever and a bracket, said device comprising a member adapted to be mounted on said bracket, shutter lever actuating means mounted in said member, and extending to a distant member a flexible conduit fastened to said member, a wire fastened to said lever actuating means and passing through said conduit engaging said distant member by means of which said lever is actuated, said wire and conduit being formed in detachable segments.

4. A device for operating the shutter lever of a camera, comprising means adapted to be mounted on said camera for actuating said lever, and power transmitting means connecting said lever actuating means with an operating member, said transmitting means being composed of detachable conduit segments and corresponding detachable wire segments movably mounted therein whereby the length of said means may be varied.

5. A device for operating the shutter lever of a camera, comprising means for engaging said lever, operating means, power transmitting means connecting said operating means with said lever engaging means, said transmitting means including detachable conduit segments joined by a threaded tube and cap, and wire segments detachably connected by turnbuckles positioned in said conduit segments.

6. A shutter-actuating device for a camera having a shutter lever and a bracket, said device comprising a tubular member adapted to be mounted on said bracket, a lever actuating member slidably mounted in said tubular member, a casing including a movable arm to operate said lever actuating member, a conduit connecting said tubular member and casing, and a wire slidably positioned in said conduit and connecting said lever actuating member and said operating arm, said conduit and wire being formed in segments detachably threaded together.

7. A device for operating the shutter lever of a camera, comprising means adapted to be mounted on said camera to actuate said lever, a casing provided with a slidable plunger having arms extending from said casing, a conduit connecting said means and casing, and a wire connecting said lever actuating member and said plunger and being mounted in said conduit, said conduit and wire being formed in detachable segments, the conduit segments being joined by a threaded tube and cap and the wire by a turnbuckle connection.

8. A device for operating the shutter lever of a camera, comprising means adapted to be mounted on said camera to actuate said lever, a casing provided with a slidable member having finger engaging means extending through said casing, a conduit connecting said means and casing, and a wire slidably mounted in said conduit and connecting said lever actuating means and said finger engaging means whereby said actuating means may be operated whether said conduit is slack or taut, said conduit and wire being formed in detachable segments.

9. A shutter actuating device for a camera having a shutter lever and a supporting bracket with arms, said device comprising a tubular member and means for removably clamping said member on said bracket arms, a plunger slidably mounted in said tubular member, a lever actuating member extending laterally from said plunger for engaging and actuating said lever, resilient means enbracing said plunger for normally retaining said lever actuating member in released position, and power transmitting means connecting said actuating member and said tubular member with a distant operating member.

In testimony whereof I have signed my name to this specification in the presence of two subscribing witnesses.

ERIC NELS BERGGREN.

Witnesses:
  MATILDA RIFF,
  FREDA C. APPLETON.